Nov. 12, 1946.   G. KLEIN   2,410,980
DOOR MOUNTING FOR COOKING STOVES OR THE LIKE
Filed June 8, 1945   2 Sheets-Sheet 1

INVENTOR.
GUSTAV KLEIN
BY Louis Necho
ATTORNEY.

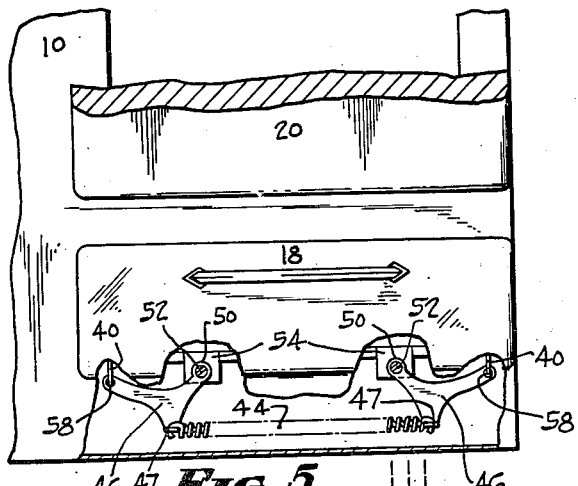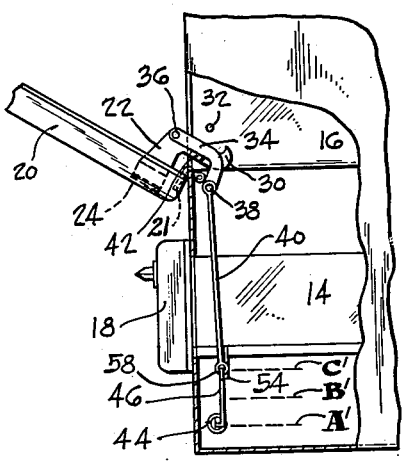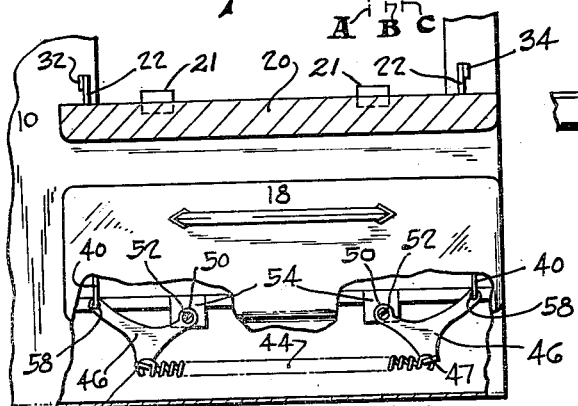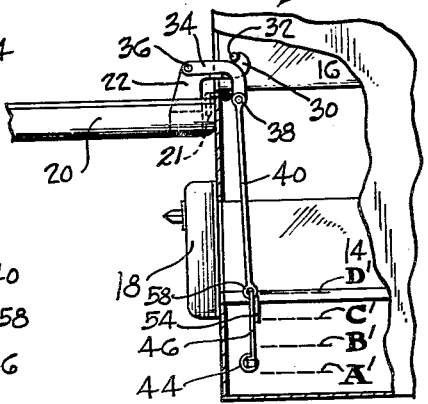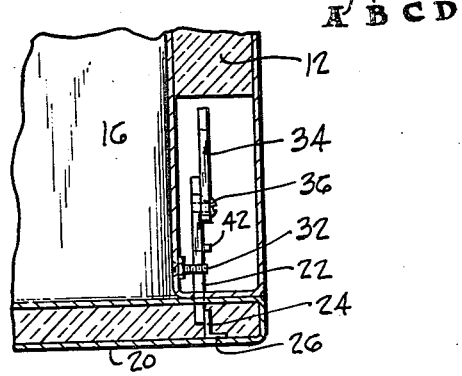

Patented Nov. 12, 1946

2,410,980

UNITED STATES PATENT OFFICE 2,410,980

DOOR MOUNTING FOR COOKING STOVES OR THE LIKE

Gustav Klein, Melrose Park, Pa., assignor to Caloric Gas Stove Works, Philadelphia, Pa.

Application June 8, 1945, Serial No. 598,221

2 Claims. (Cl. 126—191)

My invention relates to a cooking stove and has for an object to produce improved means for mounting the oven door of such stove.

A further object is to produce improved oven door mounting means which will balance the door in any position to which it is opened, after the door has been opened to a predetermined extent, but which will close the door gently if the door is not opened beyond said predetermined extent; which will exert uniform closing pressure against the door when the latter is closed, so as to avoid heat loss due to non-uniform abutment of the door against the frame defining the oven door opening; which will not be subjected to intense heat and, hence, will not deteriorate while in use; which is readily accessible for replacement when necessary, and which will be inexpensive to manufacture and install.

These and other objects are effected by my invention as will be apparent from the following description and the accompanying drawings forming a part of this application and in which:

Fig. 5 is a view, similar to Fig. 3, showing the oven door opened somewhat more than it is in Fig. 3;

Fig. 6 is a side elevational view of Fig. 4;

Fig. 7 is a view similar to Fig. 3, showing the door fully open;

Fig. 8 is a side elevational view of Fig. 7; and

Fig. 9 is an enlarged, fragmentary section on line IX—IX of Fig. 2.

Figure 1:
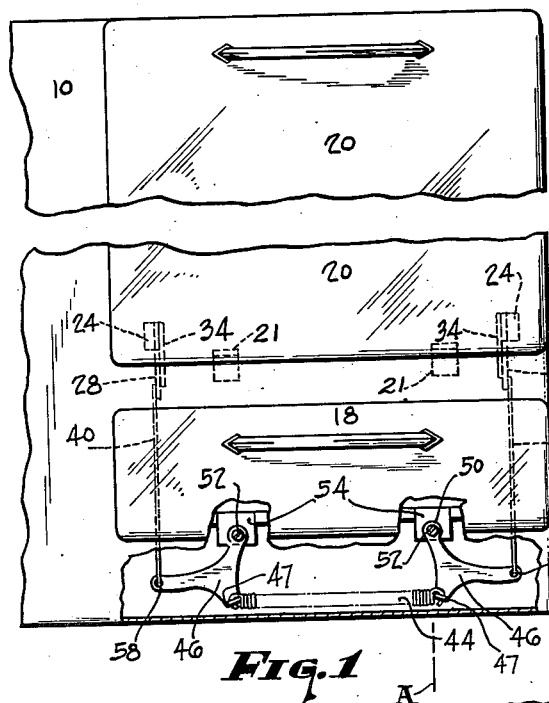
Fig. 1 is a fragmentary, front elevational view of a cooking stove provided with oven door mounting means embodying my invention.

Referring to Fig. 1 of the drawings, 10 designates the supporting framework or housing of a cooking stove, such as an ordinary gas or electric range. The framework may be of any desired construction and certain walls thereof are insulated, as at 12. (See Fig. 9.) The framework 10 defines a lower broiler compartment 14 and an upper oven compartment 16, the front access openings of which are closed by doors 18 and 20, respectively. While the invention is applicable to either of these doors, or to any horizontally hinged door, it will hereinafter be described in its application to an oven compartment door hinged at 21 to the framework of the stove.

The door mounting includes a pair of articulating mechanisms located at the opposite sides of the door. Each of these mechanisms comprises a lever 22, which, at its outer end, is secured to or carries an angle 24 (see Fig. 9) which, in turn, is spot-welded or otherwise secured to the door at 26. The lever 22 also includes an angular portion 28 which terminates in a hook 30, adapted, when the door is fully opened, to engage a stop 32 to limit movement of the door in opening direction beyond the position shown in Fig. 8.

A bent link 34 has one end thereof pivoted to the lever 22, as at 36. The other end of the bent link 34 is pivoted at 38 to the upper end of a link or hanger 40. The bent link 34 is so arranged that, when the door is opened to, and beyond, the position shown in Fig. 4, the bent link is engaged by a lug 42 carried by the lever 22 so that the lever 22 and the bent link 34 will move jointly from the position shown in Fig. 4 to that shown in Fig. 8. This movement of the bent link pulls upwardly on the hanger 40 when the door is moved in opening direction and vice versa.

The upward movement of the hangers 40 on the opposite sides of the oven door is resisted by a horizontally-disposed spring 44 which is located below the front of the broiler compartment. In this position, the spring is not subjected to any heat since it is surrounded by the ambient air of the room. Also, in this position, the spring is readily accessible without having to move the stove and in so doing disconnect the gas pipes, etc.

The spring 44 is connected at its opposite ends 47 to the arms 46 of the three armed levers 48. These three armed levers are provided with upwardly-extending arms 50 which are pivoted about horizontal pivot pins 52 carried by brackets 54 secured to or forming part of the housing of the stove. The three armed levers 48 are also provided with arms 56 which are pivoted to the lower ends of the hangers 40, as at 58. It will be noted that the three armed levers 48 are so constructed that the arms 56 thereof are longer than the arms 46 and 50 and that the pivots 58 of the arms 56 are remote from the pivot points 50, thereby imparting a certain amount of mechanical advantage. Also, it will be further noted that the three armed levers 48 are so arranged that, when the door is closed as in Fig. 1, the points at which the ends of the spring are connected to the arms 46 are in substantial vertical alignment with the pivot points 52.

Operation

Figure 2:
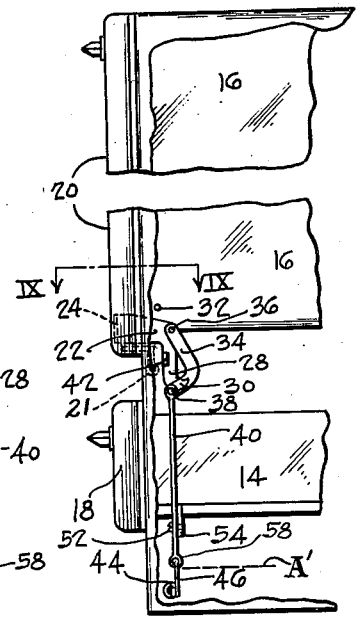
Fig. 2 is a similar side elevational view of the stove shown in Fig. 1.
Figure 3:
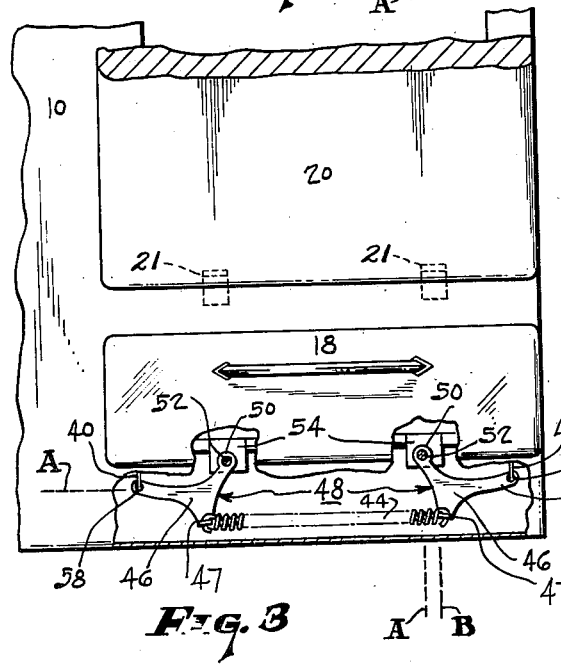
Fig. 3 is a fragmentary, front elevational view showing the oven door slightly opened.

When the oven door is closed, as in Figs. 1 and 2, the spring 44 is almost, but not quite, fully contracted, the pivot points 58 of the hangers 40 are in their lowest positions, and the ends 47 of the spring are substantially directly below the pivot points 52 of the three armed levers 48, as indicated by the line A. In this position, the spring exerts a uniform closing pressure on the opposite ends of the door, the pressure of the spring being relatively small but sufficient to insure tight closing of the door against its frame. Since the structure and operation of the mounting means on opposite sides of the door are identical, only the operation of the structure on the right-hand side of the oven door will be described.

As the oven door is opened, the lever 22 and the bent link 34 are moved upwardly and outwardly, thus pulling up on the hanger 40 against the action of the spring 44. If the door is opened only to about the extent shown in Fig. 4, the ends 47 of the spring will move only from the line A to the line B. In other words, the spring is stretched very little and will, therefore, close the oven door relatively gently. The reason for this reduced stretching of the spring lies in the structure of the three armed levers 48 and the relation of the arms 46 and 50 thereof to each other and to the pivot point 52. For example, because of the length and position of the arm 56 relative to the arm 46, the pivot point 58 will move upwardly from the line A' to the line B', or about twice the distance between the lines A and B. Thus, the stretching of the spring is minimized in relation to the movement of the hanger in response to opening of the door. Also, in this position, the center of gravity of the oven door is still relatively close to the vertical plane of the door opening, so that even the relatively small force of the slightly stretched spring is enough to move the door to closing position but, as stated, the door is moved relatively gently. It is also to be noted that in the position shown in Fig. 4, the bent link 34 has just come in contact with, but has not begun to exert any pressure against the lug 42 on the portion 28 of the lever 22. There is, therefore, no extraneous force to interfere with the closing of the door by the spring.

Figure 4:
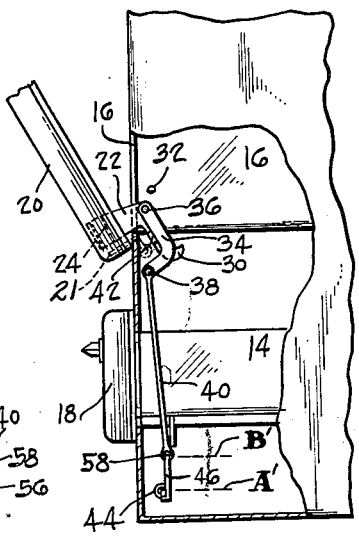
Fig. 4 is a side elevational view of Fig. 3.

When the door is opened beyond the position shown in Fig. 4, as for example, to the position shown in Fig. 6, the center of gravity of the door is further removed from the vertical plane of the door opening and the bent link 34 engages and presses down on the lug 42. The weight of the door overcomes the force of the spring, so that the door remains in open position but is prevented from falling to the position of Fig. 8 by the spring 44. In other words, the door is balanced. Again it will be noted that, while the spring has been further stretched a distance equal to the distance between the lines B and C, the pivot point 58 has moved upwardly from the position indicated by the line B' to the position indicated by the line C', or about twice the distance from the line B to the line C. The same is true when the oven door is fully opened, as shown in Fig. 8, in which engagement of the hook 30 with the stop 32 prevents further movement of the door. Fully opening the door stretches the spring a distance equal to the space between the lines C and D, while the pivot 58 is moved upwardly from the position indicated by the line C' to the position indicated by the line D', or about twice the distance between the lines C and D.

It will be noted that, due to the arrangement of the arms 46 and 56 and their relationship to the pivot 52, the length of the spring need be only equal to the distance between the lower arms 46 when the door is closed, which distance is considerably less than the width of the door. This is due to the length of the arms 56, the ends of which extend to the vertical planes of the hangers at the opposite sides of the door, as will be seen from Fig. 1.

From the foregoing it will be seen that, by my construction, not only a shorter spring can be used but that, due to the minimized stretching of the spring as the door is opened, the life of the spring is greatly increased.

What I claim is:

1. The combination with a range structure defining an oven compartment having a front access opening, a door for closing said opening, and hinge means for mounting said door for rotation about a horizontal axis in closing or opening direction, of means for urging said door in closing direction when said door is moved in opening direction to a predetermined point, and for retaining said door in any position to which it is moved beyond said point, said means including bent links pivotally connected, at their upper ends, to said door, rigid hangers disposed parallel to and adjacent the sides of said door with the upper ends of said hangers connected to the lower ends of said bent links and with the lower ends of said hangers disposed below said oven compartment in all positions of said door, a pair of levers, said levers having upper relatively short arms pivoted to said structure at points below said oven compartment and inwardly spaced from the vertical planes of said hangers, whereby said levers are rotatable about horizontal axes normal to the axis of rotation of said door, said levers further including lower relatively short arms disposed in substantially the vertical planes of said upper arms, and horizontal arms disposed substantially midway between the ends of said upper and lower arms and extending outwardly to the vertical planes of said hangers, the outer ends of said horizontal arms being connected to the lower ends of said hangers, and a horizontally-disposed spring connected to the ends of said lower arms for resisting rotation of said levers.

2. The structure recited in claim 1 in which the horizontal arms of said levers are so related to said upper and lower arms and to the pivot point of said levers that the movement of the outer ends of said horizontal arms is about twice as extensive as the movement of the lower ends of said lower arms so that said spring is stretched and contracted to a relatively small extent as compared with the movement of said door in opening or closing direction.

GUSTAV KLEIN.